C. H. PLUMMER.
METHOD OF SHELLING PEAS.
APPLICATION FILED JUNE 17, 1918.
1,415,896.
Patented May 16, 1922.
2 SHEETS—SHEET 2.
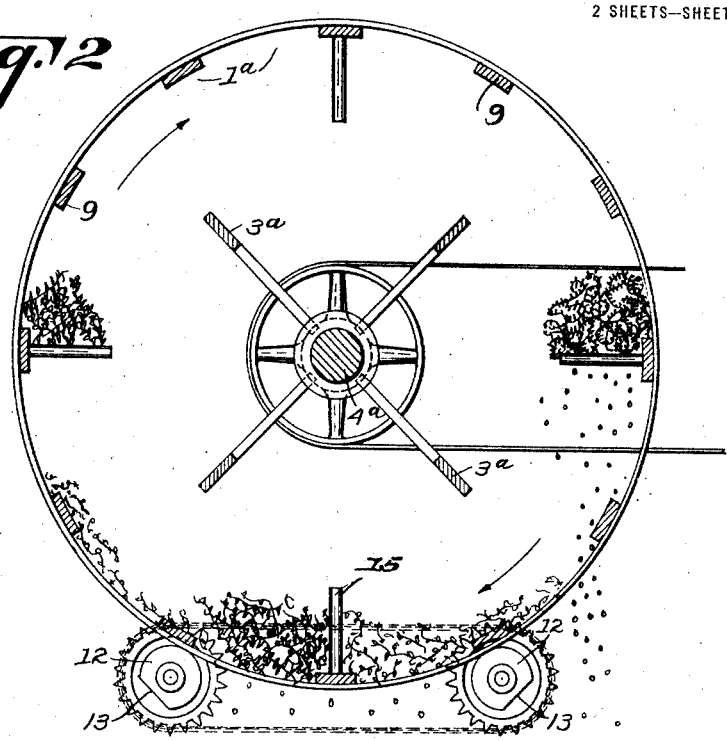
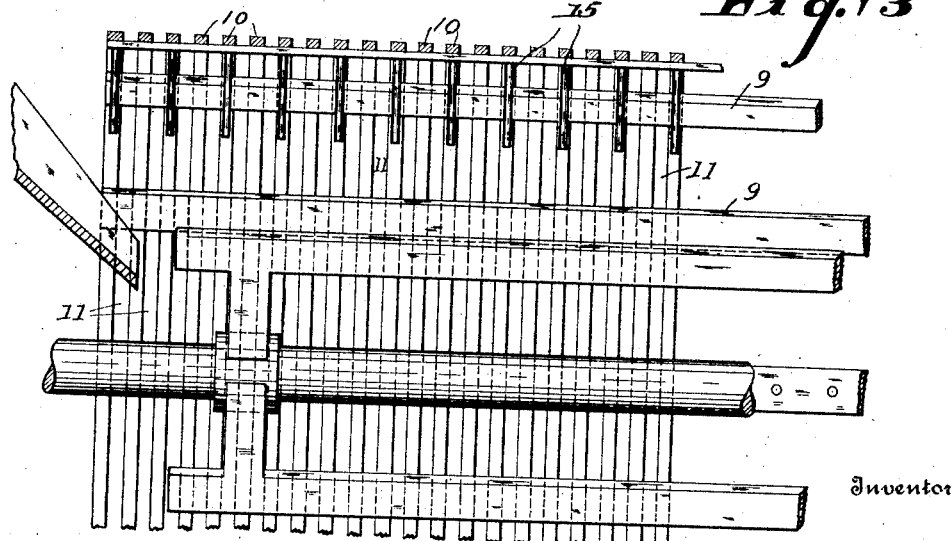

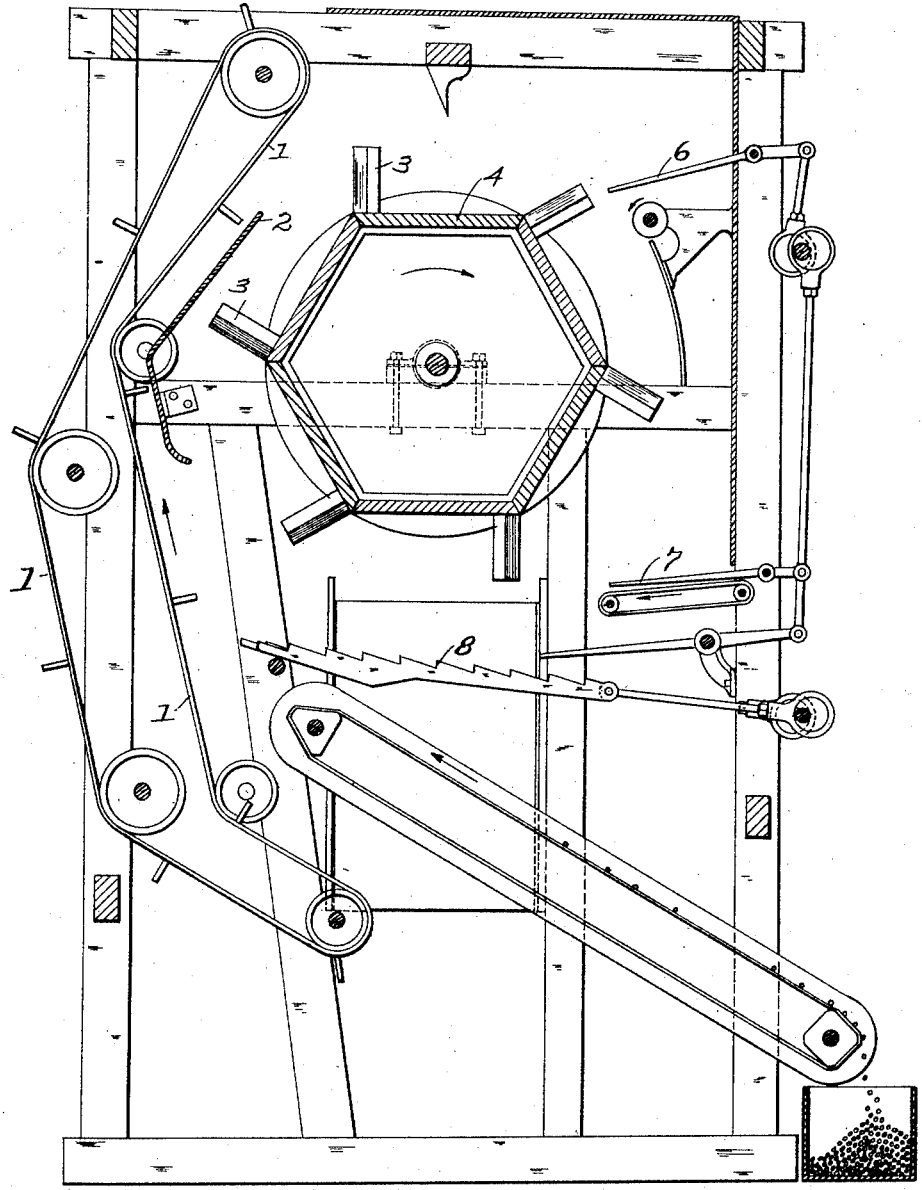

UNITED STATES PATENT OFFICE.

CLARENCE H. PLUMMER, OF KEWAUNEE, WISCONSIN.

METHOD OF SHELLING PEAS.

1,415,896.     Specification of Letters Patent.     Patented May 16, 1922.

Application filed June 17, 1918. Serial No. 240,392.

*To all whom it may concern:*

Be it known that I, CLARENCE H. PLUMMER, a citizen of the United States, residing at Kewaunee, county of Kewaunee, and State of Wisconsin, have invented new and useful Improvements in Methods of Shelling Peas, of which the following is a specification.

My invention relates to improvements in methods of shelling green peas and removing them from their pods and vines.

My invention is based upon the discovery that, in any pea shelling operation, the greatest danger of crushing the peas arises after the latter have been released from the pods, and the object of my invention is to provide an improved method whereby the free peas will not be subjected to either crushing pressure or impacts, and this object I propose to accomplish by removing the free peas from the field of operation of the shelling mechanism, or mechanisms, as soon as it is practical to do so after the pods have been opened.

To accomplish the result sought where the shelling operation is substantially continuous, it is necessary to continuously remove the free peas. But where the shelling operation is intermittent, the removal of the free peas may take place in the intervening intervals.

In a companion application filed by me for which Letters Patent have been granted, No. 1269211, dated June 11, 1918, I have described and claimed one form of mechanism for carrying out my method, but the method in itself is not dependent upon any specific mechanism nor upon the use of any specific shelling process, although I prefer the shelling process disclosed in said companion application in which the pods and vines are struck while in free air and subject to no resistance except that of the air and their own inertia.

In the drawings:

Figure 1 is a vertical sectional view of one form of apparatus for carrying out my improved process, the same being the apparatus disclosed in my former application.

Figure 2 is a vertical sectional view of another form of apparatus for carrying out my improved method, in which the same shelling method is utilized as that employed in the apparatus shown in Figure 1.

Figure 3 is a fragmentary view in longitudinal section, of the form of apparatus shown in Figure 2.

Like parts are identified by the same reference characters throughout the several views.

In carrying out my improved method, I preferably subject the vines or pods to a single pod opening or breaking blow and then remove the free peas from the mass and subsequently subject the pods or pods and vines to another blow. This method is followed in the apparatus disclosed in Figure 1, in which the material is lifted by an elevator 1 and delivered over an inclined feedway 2 into the path of revolving beater wings 3 carried by a rapidly rotating drum 4. The material is thrown by the beater wings upon a set of shaking fingers 6 which allow them to again drop into the path of the beater wings at the side of the drum opposite that on which the elevator is located. The material is then allowed to drop or be thrown to other sets of shaking fingers 7 and 8, whereby the material is agitated in a manner to shake out the free peas and whereby the vines and pods are returned to the elevator. The specific structure and arrangement of the shaking fingers is not essential, and therefore detailed description is deemed unnecessary.

In Figure 2, a rotating drum 1ª is provided with inwardly projecting bars 9 which are employed to lift the pods and vines and allow them to drop repeatedly. The periphery of the drum is of skeleton formation with openings of sufficient size and number to permit the free peas to pass to the exterior. In the construction illustrated, the peripheral wall of the drum is composed of a series of hoops 10, thereby forming segmental slots 11 between the hoops and extending annularly from one of the bars 9 to the next. The drum is rotated by means of one or more supporting shafts or rollers 12 which are flattened at 13 and allow the drum to drop once during each revolution of the rollers, thereby subjecting the contents of the drum to a succession of vibratory shocks. The shafts or rollers 12 may be continuously rotated from any suitable source of power, and the drum is preferably inclined or tilted downwardly toward the discharge end to facilitate feeding the contents progressively toward that end.

A beating drum or shaft 4ª provided with beater wings 3ª is adapted to perform the shelling operations in substantially the same manner as is the case with the structure shown in Figure 1, but the peas are allowed to drop after each shelling operation to the bottom of the drum where they are subjected to shaking operations due to the vertical agitation of the drum developed by the flattened rollers 12, this agitation continuing while the pods and vines are being lifted preparatory to another beating operation.

In the construction shown longitudinal rows of fingers 15 are connected with some of the bars 9 of the drum, and these serve to lift the vines and pods to a point where they will fall into the path of the beater wings. The intermediate bars lift the material for only a short distance, and then allow it to drop or roll downwardly to the next set of fingers, thus additionally agitating the material and causing the free peas to drop between the peripheral hoops.

While I have shown several pea shelling machines combined with separating mechanism for the purpose of enabling me to carrying out my improved method, and while in each of these shelling machines the impact method of shelling is employed, I do not intend to limit the scope of my invention to machines which employ this method of shelling, it being obvious from the foregoing description, that it is important to remove the free peas from the path of any movable member which operates to break, split, or otherwise open the pods.

I claim:—

1. The method of removing green peas from their pods and vines which consists in dropping them in free air, subjecting the freely falling pods to a beating operation, agitating them to shake out the free peas, and repeating the dropping and beating operations.

2. The method of removing green peas from their pods and vines, which consists in subjecting the pods to a series of impacts while allowing them to fall in free air, and catching and agitating them to shake out the peas in the intervals between successive impacts.

3. The method of removing green peas from their pods and vines, which consists in subjecting the pods to a series of impacts while allowing them to fall in free air and catching and agitating them in vertical planes to shake out the peas in the intervals between successive impacts.

4. The method of removing green peas from their pods and vines, which consists in subjecting the pods to a series of impacts while allowing them to fall in free air and catching and supporting them at separated points in the intervals between successive impacts, agitating them while so supported to allow the free peas to fall through between the points of support, whereby the impacting of free peas may be avoided.

5. The method of removing green peas from their pods and vines, which consists in dropping the pods and vines in free air, subjecting them to a single impact while falling, catching and shaking them to dislodge the free peas, while supporting the pods and vines at a plurality of points along separated lines of support, and repeating the single impacting and shaking operations.

In testimony whereof I affix my signature in the presence of two witnesses.

CLARENCE H. PLUMMER.

Witnesses:
ERMA E. HESSEL,
JOS. J. SCHULTZ.